United States Patent
Thompson

(10) Patent No.: US 10,676,834 B2
(45) Date of Patent: Jun. 9, 2020

(54) MINING METHOD AND USE OF MINED MATERIAL IN PRODUCTION OF GRAPHENE AND GRAPHITIC MATERIAL

(71) Applicant: TALGA RESOURCES LTD

(72) Inventor: Mark James Thompson, Wembley Downs (AU)

(73) Assignee: TALGA RESOURCES LTD, West Perth (AU)

(*) Notice: Subject to any disclaimer, the term of this patent is extended or adjusted under 35 U.S.C. 154(b) by 0 days.

(21) Appl. No.: 15/738,303

(22) PCT Filed: Jun. 23, 2016

(86) PCT No.: PCT/AU2016/000220
§ 371 (c)(1),
(2) Date: Dec. 20, 2017

(87) PCT Pub. No.: WO2016/205862
PCT Pub. Date: Dec. 29, 2016

(65) Prior Publication Data
US 2018/0179648 A1    Jun. 28, 2018

(30) Foreign Application Priority Data

Jun. 23, 2015  (AU) ................................ 2015902428
Nov. 17, 2015  (AU) ................................ 2015904740

(51) Int. Cl.
C25B 1/00         (2006.01)
C25B 11/12        (2006.01)
(Continued)

(52) U.S. Cl.
CPC ............. *C25B 11/12* (2013.01); *C01B 32/20* (2017.08); *C25B 1/00* (2013.01); *E21C 41/14* (2013.01); *E21C 41/00* (2013.01)

(58) Field of Classification Search
None
See application file for complete search history.

(56) References Cited

U.S. PATENT DOCUMENTS 8,858,776 B2    10/2014 Li et al.
9,221,687 B2    12/2015 Loh et al.
(Continued)

FOREIGN PATENT DOCUMENTS

CN    104264179    1/2015
GB    2520496      5/2015
(Continued)

OTHER PUBLICATIONS

TALGA Resources "Graphite Projects Presentation" Mar. 2013. (Year: 2013).*
TALGA resources "Mines and Money London Presentation" Dec. 2013. (Year: 2013).*
International Patent Application No. PCT/US2016/000220, International Search Report dated Aug. 24, 2016.
TALGA Resources Ltd, URL:http://www.talgaresources.com/irm/PDF/1510/TalgaResearchNote ,Published on Mar. 9, 2015, retrieved from internet on Aug. 19, 2016, 9 pages.
(Continued)

*Primary Examiner* — Brian W Cohen
(74) *Attorney, Agent, or Firm* — Leber IP Law; Celia H. Leber

(57) ABSTRACT

A mining method (10) by which graphitic ore is produced in a form that constitutes an appropriate feedstock for an electrolytic process (20) for the production of graphitic materials through exfoliation. The graphitic ore feedstock may be utilised directly as an electrode in the electrolytic process (20). Also disclosed is a graphitic feedstock for an electrolytic process for the production of graphitic material through exfoliation of that feedstock, wherein the feedstock is less than about 99% graphite (w/w) and of a sufficiently cohesive and conductive nature as to allow electrochemical exfoliation therethroughout without fracturing that might result in collapse of a significant portion of the feedstock or that may result in a loss of conductivity throughout a significant portion of the feedstock.

12 Claims, 1 Drawing Sheet

(51) Int. Cl.
 *C01B 32/20* (2017.01)
 *E21C 41/00* (2006.01)

(56) References Cited

U.S. PATENT DOCUMENTS

2013/0161199 A1  6/2013  Li et al.
2014/0027299 A1* 1/2014  Loh .................. B82Y 40/00
                                                205/338

FOREIGN PATENT DOCUMENTS

| WO | 2013089642 | 6/2013 |
| WO | 2013132261 | 9/2013 |
| WO | 2015074752 | 5/2015 |
| WO | 2015090622 | 6/2015 |

OTHER PUBLICATIONS

Scoping Study Demonstrates Robust Returns From Vittangi Graphite-Graphene Project in Swedent, www.talgaresources.com/irm/PDF/1440/VittangiScopyingStudy, published on Oct. 9, 2014, retrieved from internet Aug. 19, 2016, 8 pages.
International Patent Application No. PCT/US2016/000220, Written Opinion, dated Aug. 24, 2016.
Xing et al., "Disorder in ball-milled graphite revealed by Raman spectroscopy", Carbon 57, Feb. 18, 2013, pp. 515-519.
Coleman, "Liquid Exfoliation of Defect-Free Graphene", Accounts of Chemical Research, vol. 46, No. 1, Mar. 20, 2012, pp. 14-22.
Bonaccorso et al., "Production and processing of graphene and 2d crystals", materialstoday; Dec. 2012, vol. 15, No. 12, 26 pages.
Aneja et al., "Graphene based anticorrosive coatings for Cr (VI) replacement", The Royal Society of Chemistry, 2015, 10 pages.

* cited by examiner

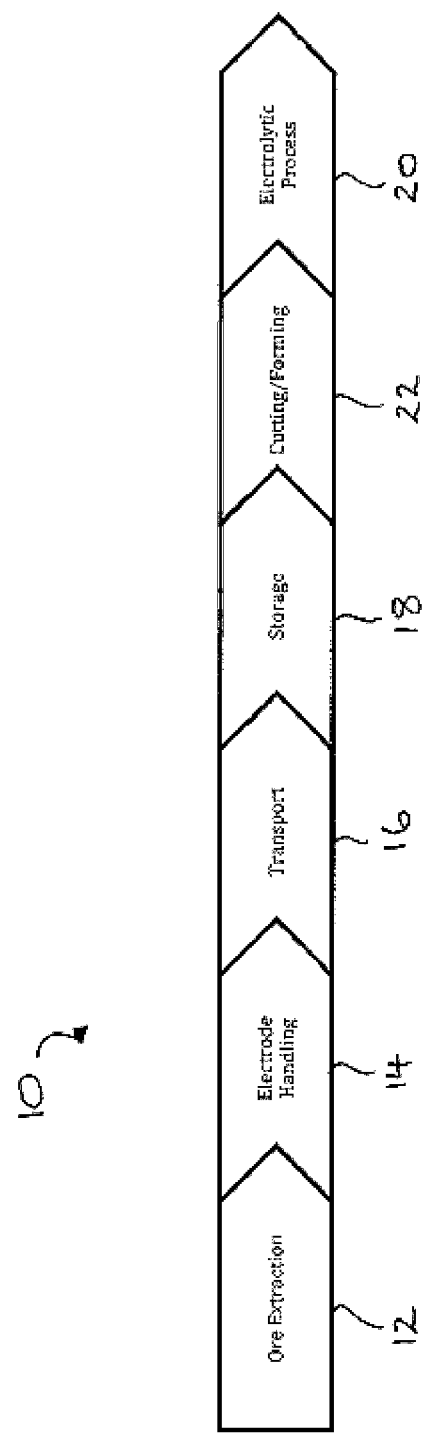

MINING METHOD AND USE OF MINED MATERIAL IN PRODUCTION OF GRAPHENE AND GRAPHITIC MATERIAL

RELATED APPLICATIONS

This application is a national phase entry of International Patent Application No. PCT/AU2016/000220, filed Jun. 23, 2016, which claims the benefit under 35 U.S.C. § 119(b) to Australian Patent Application No. 2015902428, filed Jun. 23, 2015 and Australian Patent Application No. 2015904740, filed Nov. 17, 2015, the entire contents of which are hereby incorporated by reference.

FIELD OF THE INVENTION

The present invention relates to a mining method. More particularly, the mining method of the present invention relates to a method for the mining and preparation of graphite ore. Still more particularly, the graphite ore delivered by the mining method of the present invention is intended to be readily employed in the production of graphitic material, including the production of graphene by electrolytic means.

The present invention further relates to the use of a specifically mined graphitic material in the production of other graphitic material, including micro-nano graphite and graphene, that mined graphitic material having been subjected to a level of processing significantly less than that typically employed in current graphite processing methods.

The mining method of the present invention still further relates to the methods of extraction and formation or preparation of mined graphitic ore or raw material. Such may include the mining, quarrying, shaping or forming of that mined graphitic ore or raw material.

The present invention yet still further relates to a micro-nano graphite having substantially unaltered properties relative to the graphite in the ore from which it is produced. More particularly, the micro-nano graphite of the present invention has, inter alia, an edge morphology unaltered from the graphite in the ore from which it is produced.

BACKGROUND ART

Graphene

Graphene is an allotrope of carbon, essentially a one-atom or few-layers hexagonal sheet of crystalline graphite. Graphene was first reported as isolated individual sheets in 2004. It displays remarkable properties which are suppressed in multi-layer crystalline graphite. These properties include very fast transmission of charge, the highest mechanical strength and greatest thermal conductivity yet measured, and room temperature quantum Hall effect. The quantum Hall effect is a quantum-mechanical phenomenon that is observable in very high magnetic fields at room temperature. In this condition, single atomic sheets of graphene display frictionless current flow and electrical resistances as low as a billionth of an ohm.

The available literature suggests that graphene is around 200 times stronger than steel, is more conductive than copper, can make conventional solar panels 50 to 100 times more efficient, is 50 to 100 times faster than today's semiconductors, and has the potential to make aircraft 70% lighter, charge batteries up to 10 times faster, and store up to 10 times more energy. It could also be used in the manufacture of super-capacitors for the electronics industry. Still further, graphene is likely to have applications in LEDs, touch screens, photodetectors, ultrafast lasers, membranes, spin valves and high frequency electronics and as an additive to polymers for paint coatings, electroplating solutions, composites and battery electrodes.

There are two main forms of graphene end product. These are graphene films; continuous and uniform covering the surface of a substrate, and platelets; smaller flakes (diameter <38 µm lateral dimension) that can be sold in the form of powder or in suspension.

Production of Graphene

There are many available prior art production methods for graphene, even at this early stage in graphene's development. Up to a dozen major methods are presently being used but only a small number of these are understood to be scalable. It is estimated that hundreds of tonnes of graphene are presently being produced per annum. However, no single manufacturing method stands out as the best. Each manufacturing or production method has its merits, such as quality, cost or volume. However, each method also has its drawbacks, such as highly refined or expensively prepared graphitic feedstock, or small or flawed graphene sheets or toxic by-products for example.

The source of the carbon and the type of method used to either grow graphene (bottom-up processes), or liberate graphene from a natural source of graphite (top-down processes) generally dictates the potential end use. The method employed further brings implications/limitations for the quality and level of defects, which in-turn influences the applications to which graphene is suited. Current or early applications appear most likely to use exfoliated graphene flakes or platelets (a top-down process), whereas applications that require large, defect-free graphene sheets are likely to take longer to develop (for example solid state electronic applications that require a bottom-up process).

The readily apparent flaw with all presently known methods relates to the scale of production and the prohibitive cost. There is no known method for the production of graphene that facilitates large scale bulk production of graphene for end use consumer products.

As noted above, technologies for the production of graphene may be divided into two broad categories, bottom-up or top-down, each of which include a range of specific production methodologies. All these methods require high purity graphite or highly prepared carbon materials as feedstock for graphene production processes.

Bottom-up methods mean that graphene is made (grown) using carbon molecules typically from a pure hydrocarbon source. Graphene is assembled atom by atom onto a substrate which ensures very few atomic layers and low defect films. However, the high temperature and pressure, complex equipment and handling complications required to grow and transfer the graphene makes this a very high cost approach. Specific bottom-up methods include chemical vapour deposition (CVD), growth on silicon carbide (epitaxial growth), growth on metals through precipitation, molecular beam epitaxy, and chemical synthesis using acetylene, methane or benzene as the building block.

The top-down methods mean that graphene naturally already exists and is liberated from its host, for example graphite mineral concentrate or synthetic graphite (highly ordered pyrolytic graphite—HOPG). There are many processes that rely on natural or synthetic graphite as the graphene precursor material. These methods predominantly produce flakes of graphene of variable thickness (for example, a distribution that includes a percentage of single to few layer material (1-10 atom layers) being few layered graphene (FLG) and a many layered material (10-150 atom layers) being graphene nanoplatelet (GNP)). Specific top-down processes include mechanical or micro-mechanical exfoliation/cleavage, sonication, laser ablation and photo-exfoliation, anionic bonding, and electrochemical exfoliation.

A variety of techniques for the exfoliation of a variety of graphitic substances to produce graphene have been demonstrated in the prior art. However, all of these are limited to laboratory scale application and each presents obvious problems when contemplating their scaling up for the production of commercial quantities of graphene. All the current processes require a feedstock of purified natural concentrate or synthetic graphite.

Bonaccorso et al. in "Production and processing of graphene and 2d crystals", *Materials Today*, December 2012, Volume 15, No. 12, pages 564 to 589; Coleman et al., ACC Chemical Research, 2013, 46(1), 14-22; and Bohm et al., patent publications WO 2015/074752A1 and WO 2015/090622A1, describe "liquid-phase exfoliation" or LPE as generally involving three steps, being the dispersion of graphite in a solvent, exfoliation and subsequent purification. These techniques typically utilise a highly processed and purified graphite source as a precursor or feedstock. Electrolytic techniques require at least one graphitic electrode for the production of graphene. These electrodes are most typically reconstituted from highly pure graphitic material. Purified starting products include synthetic graphite or natural concentrated graphite at +99% graphite ("Cg") purity.

Graphite Mining and Processing

Typical graphite deposits of the world occur in a "hard-rock" environment, for example of 50 to 100 MPa compressive strength. Any 'free digging' deposit is an exception to this general graphitic rock condition.

All presently operating graphite mines are focused on the production of flake grades. That is, the production of flake particles greater than about 75 μm and at a grade of >90% Cg. Micro-crystalline flake, of so-called amorphous sizes below 75 μm, may be produced in isolation or as a low-grade by-product from larger flake production and processing.

The first step in the extraction of graphite in a hard rock deposit is mining. The objectives of mining are typically to safely provide a target feed grade to the process plant at an economic cost. The sub-processes of mining will depend upon the form/shape, topography and orientation of the mineralisation, but will typically include:

1) Grade control;
2) Drill and blast;
3) Load and haul; and
4) Blend and stockpile.

The extraction of graphite then requires concentration of flake graphite by liberation from its host rock, a comminution process. This is followed by beneficiation processes or steps.

The initial steps in the processing of graphite ore are typically dependent upon the state of the weathering of the host rock, the flake morphology and the liberation size. For example, in highly weathered graphitic rich rock, or graphite bearing soil, the graphite mineral is generally free of the host rock whereas graphite contained within its host rock will require liberation through a comminution process.

Comminution typically comprises various stages of crushing and milling. For example, jaw crushers, rod or ball mills and cone crushers may be used to liberate the graphite and concentrate it in different size fractions, in closed circuit with classifiers. Granular contaminants (gangue) such as quartz and feldspar are ground into fines during this process whereas the graphite flake fraction is less affected and passes through to beneficiation steps. Classifying devices such as shaking screens and hydro-cyclones are typically utilised. The product of milling and screening is a slurry of particles in water that are broken down to the release size of graphite/gangue. The size distribution of particles is maximised consistent with the release of the 'primary' mineral (in this case graphite) so as to avoid over-breakage of flakes and smearing of graphite over gangue minerals present.

The size fractions of liberation may be checked by microscopic examination when the flake graphite has passed through initial processing. This establishes two things, first whether the correct graphite comminution size has been achieved, and secondly whether the graphite flakes have been completely freed from the host rock. If a proportion of the graphite is still attached to host rock particles, then the larger size fractions may well require further grinding. If further grinding is necessary, the next largest sieve-size graphite fraction is selected as the new liberation size and so on down the size range until a satisfactory size is achieved. Typically, sieve sizes range from 2 mm (largest diameter) down through each of 1 mm, 500 μm, 250 μm, 125 μm, and 75 μm. It is understood that graphite particles below this size tend not to concentrate effectively. Commonly, this process of regrinding and microscopic examination is repeated to the point at which all graphite particles have achieved what is considered to be an optimum liberation size.

In a concentration or beneficiation step, such as may be achieved using froth flotation techniques, contaminants must be removed, particularly any mica, quartz, feldspar, and carbonate gangue that may be present. The addition of reagents such as kerosene, dispersants, collectors and frothers, which coat the graphite flakes, while adjusting the pH of the mixture to about 7.5-8.5 through the addition of alkaline reagents to improve selectivity, is understood to help in this separation step. The objective of 'rougher' flotation is generation of a primary concentrate which lowers the cost of down-stream or upgrade treatment. A second or more steps of cleaner flotation further improves the sized graphite concentrates and removes any mica and other materials smeared with graphite during earlier processing.

For example, coarse particle or flake flotation is conducted mechanically agitated cells with forced air aspiration.

A combined reject or tailings slurry from flotation is pumped to disposal. Water recovery from the tails slurry may be performed via thickeners, filters or decantation from the impoundment.

Multiple stages of cleaner flotation are usually conducted on the concentrate stream. Additional dosages of reagents are often introduced at each stage. Later stages of 'cleaner' flotation may be conducted in various types of flotation cells, e.g. sparged columns. Gravity separation, e.g. hydraulic spirals or shaking tables, can be inserted into the flow-sheet to 'polish' the final concentrate.

Inter-stage regrinding of the staged concentrates, along with recycle of 'middlings' streams, are also common practice.

The number of stages of beneficiation, as well as the relationship between overall grade and recovery of graphite, depend on:

1) natural size distribution of the graphite particles;
2) type and texture of gangue minerals;
3) customer specifications; and
4) sophistication and experience of operating conditions.

The beneficiated graphite concentrates are generally dried, packaged and containerised for distribution. Concentrates can be marketed across a variety of grades and sizes to suit customer requirements, including preparation or forming of graphite electrodes. Vertically integrated graphite organisations will likely further upgrade concentrates above 98% Cg to supply high value markets, for example battery electrode materials, lubricants or feedstock for graphene production.

Such treatments will depend on the residual gangue minerals and their elemental contamination:
1) micronizing and further classification or beneficiation;
2) intensive acid leaching with Hydrofluoric acid (HF) or Hydrochloric acid (HCl) or both;
3) caustic roasting and mild acid leaching.

It should be noted that these prior art "top-down" processes are directed to the removal of gangue materials so as to produce highly purified graphitic materials and precursors for the production of graphene.

In light of the above, a process for the production of graphite/graphene that did not depend upon a purified synthetic precursor or require intensive, time consuming and expensive mining, comminution and beneficiation of natural graphite would clearly be beneficial. Further, if the expensive process of removing gangue materials and forming high purity graphitic carbon electrode material for use in the electrolytic production of graphene could be avoided, that would also be clearly beneficial. Further, if a process were developed that effectively retained the gangue material as a natural binder for a graphitic electrode, that would be beneficial. Still further, if a process were developed that allowed the production of graphene on a commercial scale that would also clearly be beneficial.

Prior art has been published that appears to suggest that a variety of graphitic material may be utilised in the electrolytic production of graphene. For example, US 20140027299/WO2013089642 describes using an "HLM rock" as an electrode in the electrolytic production of graphene. The HLM rock is described only as potentially/preferably a graphite rock, "directly mined, without any form of purification". However, little information is provided regarding either the preferred mining method employed nor of the characteristics of the HLM rock—such as what shape or character of one rock may be suitable relative to another not being suitable. However, it can be surmised that the HLM rock is a high grade/high purity graphitic rock as little or no mention is made with regard to the impact of gangue materials that might otherwise be present. In addition, the HLM rock is clearly rock or particles of irregular or randomly broken form. Further, the electrolyte used is an "HLM-based slurry", comprising "small pieces of HLM (eg. milled HLM)" in a mixture of organic solvent and a salt.

In US20130001089 an electrolytic method for the production of graphene is described using a first electrode that is a carbon material and a second electrode that may also be a carbon material or a metal. The solution used in electrolysis is described as any of an acid, a surfactant, a salt or an oxidising agent, or a combination of any of these. A range of potential carbon materials for the first electrode are proposed, including 'natural graphite flakes', highly ordered pyrolytic graphite (HOPG), carbon rod and amorphous carbon. The examples provided in this document rely on purified carbon 'bulk' materials, specifically natural graphite flakes, HOPG or a nano-carbon material. Whilst there is broad reference to use of a 'carbon material' there is no teaching present that a raw ore be utilised, nor any detail regarding what features of such a raw quarried ore may be beneficial or how traditional problems associated with using such an electrode material may be mitigated. The electrolyte is described as an anionic surfactant.

WO 2013132261 describes a process for the electrolytic production of graphene that utilises a graphitic negative electrode, a positive electrode that may be graphitic also, and a solvent that has organic and metal ions as cations. Preferred materials for the negative electrode are said to include "highly ordered pyrolytic graphite (HOPG), natural and synthetic graphite". Further, the electrode may be "a single graphitic crystalline flake or many flakes held together". This document goes on to suggest that in a preferred embodiment the graphitic material of the negative electrode "may be treated prior to use in order to improve its electrochemical exfoliation". No disclosure is provided as to how a 'natural' graphite electrode may be provided, nor how it "may be treated". The electrolyte used in the electrolytic exfoliation step is described as an organic solvent with both organic ions and metal ions.

US 2013/0161199 describes an allegedly large scale process for the rapid production of graphene and graphene oxide using electrochemical exfoliation. A first electrode is said to include graphite. Starting graphite material is disclosed as potentially including 'natural graphite in a layered structure' amongst other options, such as HOPG, coal, carbon material containing graphite flakes and so on. Further, the graphite material can be "a crystalline graphite layer material in the form of large particles, fragments, or powder". However, no detail or disclosure is provided regarding how or why a raw graphite material might be utilised, nor as to why it might be expected to function sufficiently/effectively. Further, the electrolyte is disclosed as potentially being "hydrogen bromide, hydrochloric acid, or sulphuric acid". An additional oxidant may be provided. Additional options of heating, use of ultrasound or microwave and/or stirring are described. To aid the provision of a continuous process, the use of a module for filtering and separating graphene products is described, for example including a microporous sieve and a filtration membrane. This final feature is described as essential to the broadest form of the invention described. The switching of bias voltages during electrolytic exfoliation is recommended/described also, potentially through a first, second and third bias.

Each of these specific prior art disclosures fails to provide any teaching as to the provision of a quarried graphitic material in a form that can be readily utilised in the electrolytic production of graphene. Any reference to 'raw' or 'unprocessed' graphite ore in the prior art is devoid of any detail regarding how that material is formed, produced or generated. Further, the prior art is typically suggestive that the mined graphitic material is of a high purity or high graphitic content. Still further, the prior art is clearly directed to laboratory scale experiments with the techniques described therein presenting clear obstacles to being scaled up to produce what may be termed industrial or commercial bulk quantities of graphene.

Micro-Nano Graphitic Material

The term "nano" is traditionally applied to a variety of materials composed of primary particles with maximum dimensions that are typically less than 0.1 micrometre (100 nm).

Material surface or structural features that are in the range of 1-10 nm are understood to be approaching "molecular size" and may have properties that are "hybrid" between the microscopic and macroscopic world. In response to the need for graphite-based nanomaterials there is a demand for graphite platelets with primary particle sizes below 100 nm.

These platelets can be as small as 2.5 nm thick in the through plane (parallel with the "C" crystallographic axis) direction.

Micro graphite is a term applied to graphitic material typically ranging from 0.1-38 micron in lateral diameter, having what are believed to be excellent performance attributes in certain applications. Micro graphite is typically produced from comminution of larger "flakes" of graphite and is used in a range of industrial applications including lubricants and, in recent times, for batteries and conductive paints. Purities range from 97-99.9% Cg, however headline purity is often less significant than the types of impurities present (transition metallic impurities often diminish performance).

Conventional attrition mills can be used to reduce graphite particles to about 38 micron lateral dimension. Higher energy attrition milling can reduce particles down to about 10 micron, however cost efficiencies come into question and there are risks associated with introduction of media contaminants. So, for the most part, industry uses micronisation to reduce graphitic material to micron level sizes. The micronising process typically uses steam, jets of air and the particles themselves which collide with one another to reduce size. In so doing, the edges of the particles become altered from their natural shape to a more rounded form. Layer edges are crushed or rolled together which decreases the area and number of edges for reactions in various applications. It also results in high graphite losses where the broken edges contribute fine graphite particles that are not economic to recover.

Nano graphite is a product that is smaller and thinner again and shares characteristics closer to those displayed by graphene. It is believed that nano graphite cannot be economically produced via mechanical milling. Nano graphite generally has very high surface area material with micron/sub-micron lateral dimensions and thickness ranging from approximately 50-100 nm (150-300 atom layers). The small lateral size in functionalised form enhances mixing with hosts like polymers in a range of specialty applications.

Currently, micro-nano graphite is formed by a series of liberation and purification steps involving comminution, beneficiation, micronisation and purification, to enable the graphitic materials to be separated from gangue minerals. It has been hypothesised by the Applicant and since reported by K S Aneja et al., *Graphene based anticorrosive coatings for Cr(VI) replacement*, Nanoscale, 2015, 7, 17879-17888, that this process, inter alia, alters the edge morphology/topology of the graphite flakes and essentially reduces the activation state of these edges. The milling and micronisation action used in current techniques is reported (for example by Tan Xing et al., *Disorder in ball-milled graphite revealed by Raman spectroscopy*, Carbon 57 (2013), 515-519) to cause the flake morphology and crystallinity to become disordered or otherwise be altered as compared to the natural morphology of the starting material.

The methods and products of the present invention have as one object thereof to overcome the above mentioned problems of the prior art or to at least provide a useful alternative thereto.

The preceding discussion of the background art is intended to facilitate an understanding of the present invention only. The discussion is not an acknowledgement or admission that any of the material referred to is or was part of the common general knowledge at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Throughout the specification and claims the term "graphene" is to be understood to include reference to monolayer graphene, "few layer graphene" (FLG) which is graphene of between one to about 10 atom layers, graphene nanoplatelets (GNP) which is about 10-150 atom layers, unless the context requires otherwise.

Throughout the specification and claims the term "mine" or "mining" is to be understood to include reference to "quarry" or "quarrying", and other non-explosive methods of rock or ore extraction, unless the context clearly requires otherwise.

Throughout the specification and claims the term "% graphite" or "% Cg" are to be understood to refer to the same characteristic. Additionally, each term is to be understood to refer to a % (w/w).

Throughout the specification and claims reference to "micro-nano graphite" is to be understood to collectively refer to both micro and nano graphite as described hereinabove.

Throughout the specification and claims reference to "unaltered properties", "unaltered features" or variations thereof are to be understood to referring to properties or features (including chemical, structural or physical properties and features) that remain largely or essentially as they were previous to whatever action is described as having been undertaken.

Throughout the specification and claims reference is made to the micro-nano graphite of the present invention having an edge morphology unaltered from the graphite ore from which it is produced. Further, reference is made to the effect that the micro-nano graphite of the present invention does not exhibit the folding or rounding of platelet edges. Still further, the micro-nano graphite of the present invention is said to combine the features of a high aspect ratio, natural edges and a high surface area. These references are to be understood, unless the context clearly requires otherwise, as being made in comparison to, and relative to, graphitic materials produced from prior art processes that incorporate mechanical size reduction processes, for example milling, comminution, and micronisation processes, and which invariably demonstrate damage to, mechanical working of, or modification from, the naturally occurring graphitic crystal edge structures.

DISCLOSURE OF THE INVENTION

In accordance with the present invention there is provided a mining method by which graphitic ore is produced in a form that constitutes an appropriate feedstock for an electrolytic process for the production of graphitic materials through exfoliation.

Preferably, the graphitic materials produced may include one or more of graphene and micro-nano graphite.

The graphitic ore feedstock is preferably utilised directly as an electrode in the electrolytic process.

The graphitic ore feedstock is preferably extracted from a graphite ore body by non-explosive techniques.

Preferably, the non-explosive technique for extraction of the graphitic ore feedstock includes one or more of cutting, sawing, splitting and/or slicing.

Still preferably, the graphitic ore feedstock is cut, sawn, split or sliced to a size and shape that is able to be used without further size reduction in the electrolytic process for the production of graphitic materials.

The graphitic ore feedstock is preferably of a sufficiently cohesive and conductive nature as to allow electrolytic exfoliation therethroughout without fracturing that might result in collapse of a significant portion of the feedstock or that may result in a loss of electrical conductivity throughout a significant portion of the feedstock.

In one form of the present invention the graphitic ore feedstock is appropriately conductive and sufficiently strong to allow its use as an electrode material in the electrolytic process for the production of graphitic materials through exfoliation.

Preferably, the graphitic ore feedstock has an unconfined compressive strength of between about 25 to 300 MPa.

Still preferably, the unconfined compressive strength of the graphitic ore feedstock is between about 50 to 200 MPa.

Still further preferably, the unconfined compressive strength of the graphitic ore feedstock is between about 75 to 150 MPa.

Preferably, the graphitic ore feedstock has an electrical resistivity of between about 10 Ohm-metre to 0.00001 Ohm-metre, more preferably from 1 Ohm-metre to 0.0001 Ohm-meter, and more preferably from 0.1 Ohm-metre to 0.001 Ohm-metre.

The graphitic ore feedstock is preferably less than about 99% graphite (w/w). In one form of the present invention the graphitic ore feedstock is less than about 95% graphite (w/w).

Preferably, the graphitic ore feedstock comprises more than 10% graphite (w/w), more preferably more than 15% graphite (w/w), and more preferably more than 20% graphite (w/w).

Preferably, the graphitic ore feedstock further comprises gangue materials that are predominantly unreactive in the electrolytic process and insoluble in any electrolyte used therein.

Still preferably, the gangue material is consistently distributed throughout the graphitic ore feedstock.

In one form of the present invention the graphitic ore feedstock is a natural graphite ore.

In one form of the present invention the gangue material comprises unreactive and relatively strong silicate minerals consistently distributed throughout the graphitic ore material.

In accordance with the present invention there is further provided a graphitic feedstock for an electrolytic process for the production of graphitic material through exfoliation of that feedstock, wherein the feedstock is less than about 99% graphite (w/w).

The graphitic feedstock is preferably of a sufficiently cohesive and conductive nature as to allow electrolytic exfoliation therethroughout without fracturing that might result in collapse of a significant portion of the feedstock or that may result in a loss of conductivity throughout a significant portion of the feedstock.

In one form of the present invention the graphitic feedstock is highly conductive and is sufficiently strong to allow its use as an electrode material in the electrolytic process for the production of graphitic material through exfoliation.

In one form of the present invention the graphitic feedstock is a graphite ore mined directly from a graphite ore body.

In another form of the present invention the graphitic feedstock is an electrode formed from compressed and crushed or reconstituted composition.

Preferably, the reconstituted composition comprises a graphitic material and one or more binders. One suitable graphitic material is graphite flake.

A reconstituted composition for use in the present invention is preferably such that the binder is sufficiently strong and conductive to allow its use as an electrode material in the electrolytic process for the production of graphene. Alternatively, or in addition to, the graphitic material is arranged within the reconstituted composition such that a current can be passed therethroughout.

In accordance with the present invention there is still further provided a method for the use of a mined graphite material in the electrolytic production of graphitic material, the method comprising the steps of:

1) Mining a graphite ore material; and
2) Employing that graphite ore material in the electrolytic production of graphitic material without significant processing.

Preferably, the graphitic materials produced may include one or more of graphene and micro-nano graphite.

The mined graphite ore material preferably has at least one lineal dimension of greater than or equal to about 0.1 metre. Still preferably, the mined graphite material has at least one lineal dimension of greater than or equal to about 1 metre.

Still preferably, the mined graphite material is in the form of a quadrilateral (eg rectangular) solid.

Preferably, the level of processing of the graphite material does not include grinding, fine grinding or micronising. The level of processing may include coarse crushing. Accordingly, measures are preferably implemented during the transport and handling of the graphite material to reduce any breakage or deterioration of the mined graphite ore.

If the level of processing employed in the mining of the graphite ore material does employ some level of crushing then the crushed graphite ore material is reconstituted into an electrode prior to use in the electrolytic production of graphitic material.

The reconstitution of the graphite ore material comprises the addition of one or more binders, for example a silicate binder, or hydraulic cement.

The reconstituted graphite material composition for use in the present invention is preferably such that the binder is sufficiently strong and conductive to allow its use as an electrode in the electrolytic process for the production of graphene through exfoliation. Alternatively, or in addition to, the graphitic material is arranged within the reconstituted composition such that a current can be passed therethroughout.

In accordance with the present invention there is still further provided a micro-nano graphite having unaltered properties relative to the graphite ore from which it is produced.

Preferably, the micro-nano graphite of the present invention has an edge morphology unaltered from the graphite ore from which it is produced. Still preferably, the micro-nano graphite of the present invention does not exhibit the folding or rounding of platelet edges that are typically exhibited when graphite materials are exposed to mechanical size reduction processes, for example milling and comminution processes. Still further preferably, the micro-nano graphite of the present invention combines the features of a high aspect ratio, unmilled edges and a high surface area.

In one form the micro-nano graphite of the present invention comprises at least about 2% by weight graphene.

In accordance with the present invention there is yet still further provided a method for the use of a mined graphite ore material in the production of a graphitic material, the method comprising the steps of:

1) Mining a graphite ore material; and
2) Employing that graphite ore material in the production of a graphitic material without significant processing.

Preferably, the graphitic material comprises a micro-nano graphite as described hereinabove and which in one form comprises at least about 2% by weight graphene. In such circumstances it is preferable that a separation step be employed to separate the micro-nano graphite and the graphene from one another.

In one form of the present invention the production of the graphitic material comprises electrolytic means, again as described hereinabove.

The mined graphite ore material preferably has properties as described hereinabove.

Preferably, the level of processing of the graphite ore material does not include grinding, fine grinding or micronising. The level of processing may include coarse crushing. Accordingly, measures are preferably implemented during the transport and handling of the graphite ore material to reduce any breakage or deterioration of the mined graphite.

The production of the graphitic material may preferably additionally comprise one or more purification steps.

The purification steps may include one or more of a liquid separation step, a centrifuging step, a chemical leaching step and a thermal purification step.

BRIEF DESCRIPTION OF THE DRAWING

The present invention will now be described, by way of example only, with reference to several embodiments thereof and the accompanying single drawing, in which:

FIG. 1 is a diagrammatic representation of a method for the use of a mined graphite material in the electrolytic production of graphene in accordance with one embodiment of the present invention.

BEST MODE(S) FOR CARRYING OUT THE INVENTION

The present invention provides a mining method by which graphitic ore, for example graphite ore, is produced in a form that constitutes an appropriate feedstock for a commercially scalable electrolytic process for the production of graphene through exfoliation in which, in one preferred form, the graphite ore feedstock is utilised directly as an electrode in the electrolytic process. It is to be understood that the term "graphite ore" as it is used herein includes a graphitic ore.

The graphite ore feedstock is extracted from a graphite ore body by non-explosive techniques. The non-explosive technique for extraction of the graphite ore feedstock includes cutting, sawing, splitting and/or slicing (by wire for example).

The graphite ore feedstock is cut, sawn, split or sliced to a size and shape that is able to be used without further size reduction in the electrolytic process for the production of graphene.

The graphite ore feedstock is of a sufficiently cohesive and conductive nature as to allow electrochemical exfoliation therethroughout without fracturing that might result in collapse of a significant portion of the feedstock or that may result in a loss of conductivity throughout a significant portion of the feedstock.

The graphite ore feedstock is appropriately conductive and sufficiently strong to allow its use as an electrode material in the electrolytic process for the production of graphene through exfoliation.

The graphite ore feedstock has an unconfined compressive strength of between about 25 to 300 MPa, more particularly between about 50 to 200 MPa, still more particularly between about 75 to 150 MPa.

The graphite ore feedstock has a resistivity of between about 10 Ohm-metre to 0.00001 Ohm-metre, more particularly from 1 Ohm-metre to 0.0001 Ohm-meter, and still more particularly from 0.1 Ohm-metre to 0.001 Ohm-metre.

The graphite ore feedstock is preferably greater than about 10% graphite (w/w). For example, the graphite ore feedstock comprises more than 10% graphite (w/w), more particularly more than 15% graphite (w/w), and still more particularly above 20% graphite (w/w). Further, the graphite ore feedstock is preferably also less than 99% graphite (w/w), more particularly less than 97% graphite (w/w), and still more preferably less than 95% graphite (w/w).

The graphite ore feedstock further comprises gangue materials that are unreactive in the electrolytic process. The gangue material is also consistently distributed throughout the graphite ore feedstock.

In one form of the present invention the gangue material comprises unreactive and physically strong silicate materials distributed consistently throughout the graphite ore material.

In a still further form of the present invention the graphitic material has a randomly oriented flake morphology.

The present invention further provides a graphitic feedstock for an electrolytic process for the production of graphene through exfoliation of that feedstock, wherein the feedstock is less than about 99% graphite (w/w), for example less than about 95%. The graphitic feedstock is of a sufficiently cohesive and conductive nature as to allow electrolytic exfoliation therethroughout without fracturing that might otherwise result in collapse of a significant portion of the feedstock or that may result in a loss of conductivity throughout a significant portion of the feedstock.

In one form of the present invention the graphitic feedstock is appropriately conductive and sufficiently strong to allow its use as an electrode material in the electrolytic process for the production of graphene through exfoliation.

In one form of the present invention the graphitic feedstock is a graphite ore mined directly from a graphite ore body.

In another form of the present invention the graphitic feedstock is a reconstituted composition. The reconstituted composition comprises a graphitic material and one or more binders. One suitable graphitic material is graphite flake ore.

A reconstituted composition for use in the present invention is such that the binder is sufficiently strong and conductive to allow its use as an electrode material in the electrolytic process for the production of graphene through exfoliation. Alternatively, or in addition to, the graphitic material is arranged within the reconstituted composition such that a current can be passed therethroughout.

Still further provided is a method for the use of a mined graphitic ore material, for example graphite ore, in the electrolytic production of graphene, the method comprising the steps of:
1) Mining a graphitic ore material; and
2) Employing that mined graphitic ore material in the electrolytic production of graphene without significant processing.

The term "without significant processing" is intended to indicate that the level of processing of the graphite material does not include grinding, fine grinding or micronisation of ground ores, but may include crushing and screening to a size of greater than a $P_{80}$ of about 1.18 mm (16 mesh).

If the level of processing employed in the mining of the graphite ore material does employ some level of crushing then the crushed graphite material is reconstituted into an electrode prior to use in the electrolytic production of graphene. The reconstitution of the graphite material comprises the addition of one or more binders, for example hydraulic cement, as noted hereinabove, and which are unreactive with the electrolyte.

The reconstituted graphite ore material composition for use in the present invention is preferably sufficiently strong and conductive to allow its use as an electrode material in the electrolytic process for the production of graphene through exfoliation. Alternatively, or in addition to, the graphitic ore material is arranged within the reconstituted composition such that a current can be passed therethroughout.

The graphitic ore material is used as at least one electrode in the electrolytic production process and, in one form of the present invention, is formed into a shape and size such as to enable a continuous feed of electrode. For example, as one electrode is consumed, another electrode follows that electrode to effectively form a largely uninterrupted flow or continuation of electrode material.

The present invention still further provides a micro-nano graphite having unaltered properties relative to the graphite ore from which it is produced. The micro-nano graphite has an edge morphology unaltered from the graphite ore from which it is produced. It is understood by the Applicants that the micro-nano graphite of the present invention does not exhibit the distortion or rounding of platelet edges that are typically exhibited when graphite materials are exposed to mechanical size reduction processes, for example most milling and comminution processes.

The micro-nano graphite of the present invention may comprise at least about 2% by weight graphene.

The present invention also provides a method for the use of a mined graphite ore material in the production of a graphitic material, the method comprising the steps of:
1) Mining a graphite ore material; and
2) Employing that graphite ore material in the production of a graphitic material without significant processing.

The graphitic material produced by the method immediately above comprises a micro-nano graphite as described above and which in one form comprises at least about 2% by weight graphene. A separation step is employed to separate the micro-nano graphite and the graphene from one another.

In one form of the present invention the production of the graphitic material comprises electrolytic means, again as described hereinabove.

The mined graphite ore material preferably has properties as described hereinabove.

The level of processing of the graphite ore material does not include grinding, fine grinding or micronisation. The level of processing may include coarse crushing to passing size 12 mm and more preferably passing 3 mm. Accordingly, measures are implemented during the transport and handling of the graphite ore material to reduce any breakage or deterioration of the mined graphite.

The production of the graphitic material, being the micro-nano graphite, additionally comprises one or more purification steps. The purification steps include one or more of a liquid separation step, a centrifuging step, a chemical leaching step and a thermal purification step.

Example

The present invention may be further illustrated and understood through reference to the following non-limiting example.

In FIG. 1 there is shown a method 10 for the use of a mined graphite ore material in the electrolytic production of graphene. A suitable graphite ore material, being a strong, conductive graphite bearing ore, has been identified and is available to the Applicant in the Nunasvaara deposit in Sweden, being a predominantly microcrystalline flake Joint Ore Reserves Committee (JORC) mineral resource of 7.6 Mt at 24.4% graphite (Cg). Grades for this deposit have been drill tested at an average of 26.2% Cg, with grades attaining up to 46.7% Cg. The rock strength has been measured at approximately 120 MPa and the resistivity at less than 10 Ohm-meter, for example 0.0567 Ohm-meter.

A deposit of the nature of the Nunasvaara deposit in Sweden would not be, and has not been to date, considered an appropriate source of graphitic material feedstock for prior art processes for the production of graphene, as is set out and discussed in the discussion of the Background Art above.

A raw graphite ore is cut or otherwise extracted from an open pit mine or quarry (not shown) by known bulk mining methods with abrasive disks, saws, splitters or wires and other known non-explosive methods of rock extraction in an ore-extraction step 12. A block size for the raw graphite ore is chosen by an operator so as to be convenient for both removal from the deposit in an electrode handling step 14, and for transport 16 of the ore to the location of a storage facility 18, ideally nearby an electrolytic process plant 20 to which the graphite ore is fed after any necessary additional shaping, cutting or forming 22.

The blocks of ore have sizes which are suitable for transport, transfer movement, and handing. The blocks may be further cut into smaller shapes or forms of electrodes which are considered more suitable for presentation to an electrolytic process.

The blocks of ore have preferred minimum dimension of 50 mm and maximum dimension of 2000 mm. More particularly, the blocks have a minimum dimension of 100 mm and maximum dimension of 1000 mm, or still more particularly a minimum dimension of 150 mm and maximum dimension of 500 mm.

The block shape may be cubic, cylindrical, trapezoidal, conical, or rectangular solid or other shapes which are suitable for transport by trucks or railcars on pallets or other packaging or shipping containers, as well shapes that are particularly suitable for attachment or insertion to any feeding apparatus that may be employed with an electrolytic cell of the electrolytic process 20.

The ore blocks from the graphitic deposit may be employed directly as quarried as electrodes in electrolysis, or further cut into suitable shapes, or have connections inserted or attached that allow electrical current to flow from an external power source into the electrodes at controlled volts and amps.

Each block of quarried graphite ore will be selected to have a combination of carbon grade, i.e. percent graphitic carbon (% Cg), strength (i.e. resistance to fracture or breakage measured in Mega Pascals or MPa by unconfined compressive methods), and electrical resistivity (Ohm-metre).

The ore grade is preferably greater than 10% Cg, for example, more than 15% Cg. One preferred example of ore grade is above 20% Cg.

The ore strength is preferably between about 25 to 300 MPa, for example between about 50 to 200 MPa. One preferred example of ore strength is between about 75 to 150 MPa.

The ore resistivity is preferably between about 10 Ohm-metre to 0.00001 Ohm-metre, for example between about 1 Ohm-metre to 0.0001 Ohm-meter. One preferred example of ore resistivity is between about 0.1 Ohm-metre to 0.001 Ohm-metre.

The ore blocks will also contain gangue, i.e. non-graphitic minerals, which are predominately unreactive in the electrolytic process and insoluble in the electrolyte used in the electrolytic process 20.

The gangue present in the graphite ore is ideally well distributed through the ore and does not occur in veins or layers which would tend to decrease the strength of the blocks during handling or raise resistivity during the electrolytic process 20.

The gangue consists of unreactive and physically strong silicate minerals that are dispersed and spread throughout the ore blocks. The gangue may also preferably consist of small fractions by weight, i.e. less than 12% w/w of sulphide or carbonate or other reactive minerals, for example less than 6% w/w of non-silicate gangue minerals, or more preferably less than 3% w/w of non-silicate gangue minerals.

It is envisaged that any electrolytic process employed in the present invention may comprise electrolytic compositions, electrical currents and voltages (comprising one or more of magnitudes, time-dependent values, and polarity reversals) and/or electrode feed-rates to the electrolytic cell or bath, which optimise the creation of micro-nano graphite and graphene in preference to or in addition to other graphitic materials.

From the above description it can be seen that the mining method and method of use of mined graphite ore material in the electrolytic production of graphene presents significant advantages over those processes of the prior art. The methods of the present invention are unique in that, inter alia, the precursor material that forms the electrode in the cell is, in a preferred form of the present invention, direct from the ground, rather than being a highly purified, processed and expensive natural feedstock or a synthetic feedstock. This provides a significant advantage in terms of reduced capital expenditure compared to prior art processes and competing methods of graphene production. It is envisaged that significant advantages in terms of operational expenditure may also be realised.

It is envisaged that the methods of the present invention for the electrolytic exfoliation of ore, directly as described hereinabove, is able to be achieved at commercial scale, due to the relatively simple and cost effective nature of the steps utilised in combination with the selected character of the graphitic ore.

It is further envisaged that the micro-nano graphite and graphene products of the present invention are capable of being produced in commercial quantities, for example in amounts ranging from 10 kg to tonnes.

Modifications and variations such as would be apparent to the skilled addressee are considered to fall within the scope of the present invention.

The invention claimed is:

1. A method for the use of a mined graphite material in the electrolytic production of graphitic material, the method comprising the steps of:
   1) mining a graphite ore material using a non-explosive mining method such that the graphite ore material is in a form that constitutes an appropriate feedstock for an electrolytic process for the production of graphitic materials through exfoliation, the mined graphite ore material having an unconfined compressive strength of about 25 to 300 MPa and an electrical resistivity of about 10 Ohm-metre to 0.0001 Ohm-metre; and
   2) employing that graphite ore material directly as an electrode in the electrolytic production of graphitic material without significant processing.

2. The method of claim 1, wherein the graphitic materials produced include one or both of graphene and micro-nano graphite.

3. The method of claim 1, wherein the mined graphite ore material has at least one lineal dimension of greater than or equal to about:
   a. 0.1 metre; or
   b. 1 metre.

4. The method of claim 1, wherein the mined graphite material is in the form of a quadrilateral solid.

5. The method of claim 1, wherein measures are implemented during transport and handling to reduce any breakage or deterioration of the mined graphite ore material.

6. The method of claim 1, wherein the production of the graphitic material additionally comprises one or more purification steps, the purification steps include one or more of a liquid separation step, a centrifuging step, a chemical leaching step and a thermal purification step.

7. The method of claim 1, wherein the graphite ore material is of a sufficiently cohesive and conductive nature as to allow exfoliation throughout the material during the electrolytic production of graphitic material.

8. The method of claim 1, wherein the graphite ore material has an unconfined compressive strength of about 50 to 200 MPa.

9. The method of claim 1, wherein the graphite ore material is less than about 99% graphite (w/w).

10. The method of claim 1, wherein the graphite ore material comprises gangue materials that is consistently distributed throughout the graphite ore material and are unreactive in the electrolytic process and insoluble in any electrolyte used therein.

11. The mining method of claim 10, wherein the gangue material comprises silicate minerals consistently distributed throughout the graphitic ore material.

12. The mining method of claim 1, wherein the non-explosive mining method is selected from the group consisting of cutting, sawing, splitting, slicing, and combinations thereof.

* * * * *